(12) United States Patent
Skvorecz

(10) Patent No.: US 11,896,156 B2
(45) Date of Patent: Feb. 13, 2024

(54) HANDLES OF WIRE STAND FOR HOLDING PANS

(71) Applicant: Robert J. Skvorecz, Kinnelon, NJ (US)

(72) Inventor: Robert J. Skvorecz, Kinnelon, NJ (US)

( * ) Notice: Subject to any disclaimer, the term of this patent is extended or adjusted under 35 U.S.C. 154(b) by 188 days.

(21) Appl. No.: 17/561,783

(22) Filed: Dec. 24, 2021

(65) Prior Publication Data

US 2023/0200585 A1    Jun. 29, 2023

(51) Int. Cl.
*A47J 36/34* (2006.01)
*B65D 25/24* (2006.01)
*A47J 47/14* (2006.01)
*A47J 47/02* (2006.01)
*A47J 36/24* (2006.01)

(52) U.S. Cl.
CPC ............ *A47J 36/34* (2013.01); *A47J 36/2405* (2013.01); *A47J 47/02* (2013.01); *A47J 47/14* (2013.01); *B65D 25/24* (2013.01)

(58) Field of Classification Search
CPC ........ A47J 36/34; A47J 36/2405; A47J 47/02; A47J 47/14; B65D 25/24
See application file for complete search history.

(56) References Cited

U.S. PATENT DOCUMENTS

| | | | | |
|---|---|---|---|---|
| 1,283,389 A | * | 10/1918 | Wills et al. | B65D 7/26 211/74 |
| 3,972,318 A | * | 8/1976 | Lenoir | A47J 37/10 D7/354 |
| 4,718,402 A | * | 1/1988 | Fordyce | A47J 37/0694 99/426 |
| 5,029,721 A | * | 7/1991 | Timpe | A47J 36/022 220/573.1 |
| 5,503,062 A | * | 4/1996 | Buff, IV | A47J 36/22 220/756 |
| 6,065,629 A | * | 5/2000 | Sarnoff | B65D 45/02 220/573.1 |
| 6,213,005 B1 | * | 4/2001 | Sherman | A47J 27/002 220/573.1 |
| 8,678,223 B2 | * | 3/2014 | Sarnoff | A47J 45/062 220/23.91 |
| 9,414,712 B2 | * | 8/2016 | Skvorecz | A47J 47/14 |
| 2008/0251657 A1 | * | 10/2008 | Skvorecz | A47J 36/34 248/153 |
| 2013/0313211 A1 | * | 11/2013 | Skvorecz | B65D 21/046 29/428 |
| 2016/0280417 A1 | * | 9/2016 | Skvorecz | B65D 7/20 |
| 2022/0039604 A1 | | 2/2022 | Skvorecz | |
| 2022/0039606 A1 | | 2/2022 | Skvorecz | |

* cited by examiner

*Primary Examiner* — Kimberly T Wood
(74) *Attorney, Agent, or Firm* — Michael J. Feigin, Esq.; Feigin and Fridman LLC

(57) ABSTRACT

A continuous bottom/side wire extends upwards at opposite ends of a wire stand in order to form bendable handles. The resilient bendability enables modification of the position of the handles with respect to a top closed loop. The handle has bends that can be moved to encircle a part of another wire. Also part of the device are wire supports that connect the top closed loop to the bottom/side wire. A top pan with a lip and an open side facing towards an open side and lip of the bottom pan may be inserted into a cavity defined by the top loop and bottom/side wire. The two pans lips can be abutted, and they can be held in place against each other by the bends of the bottom/side wire.

20 Claims, 7 Drawing Sheets

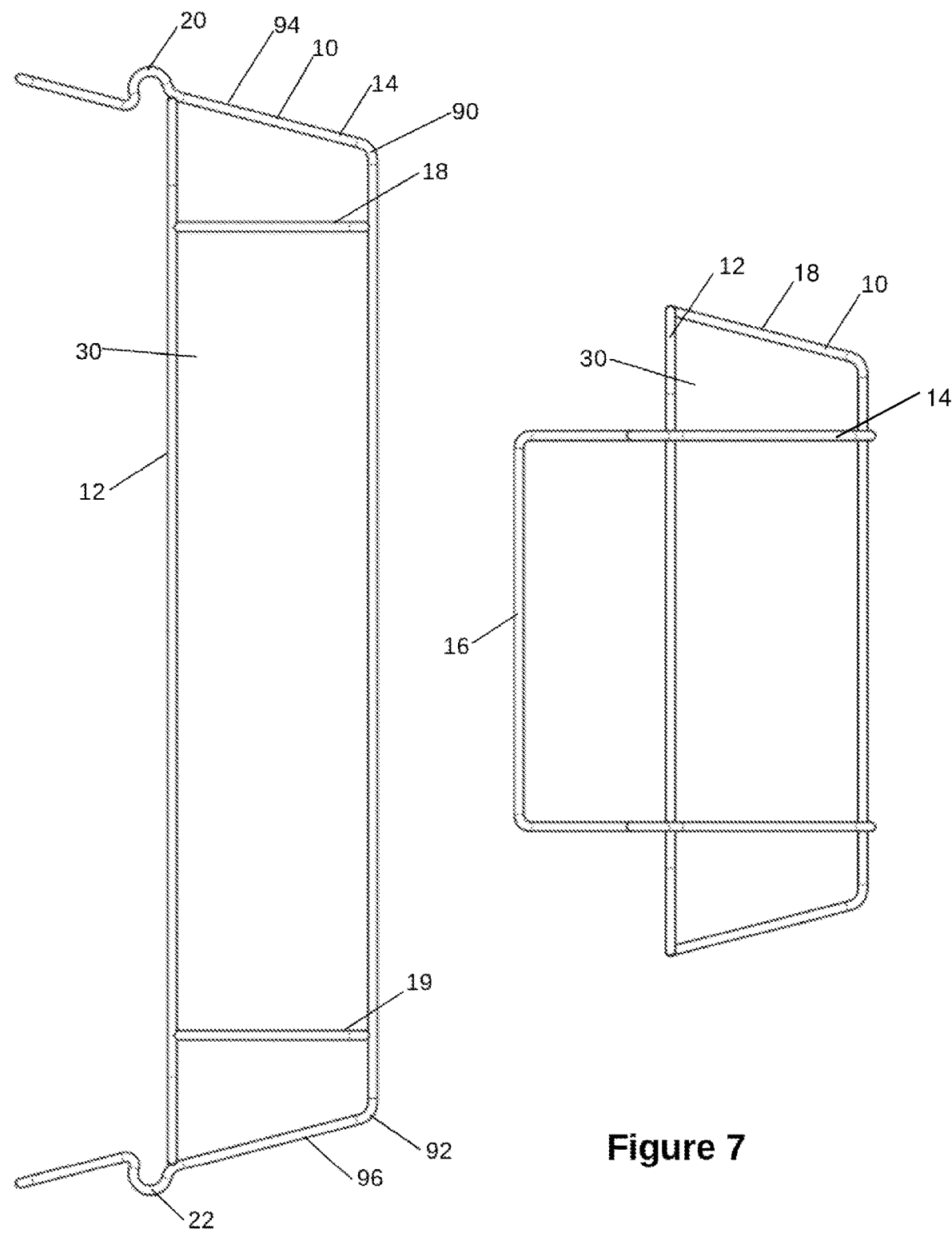

HANDLES OF WIRE STAND FOR HOLDING PANS

FIELD OF THE DISCLOSED TECHNOLOGY

The disclosed technology relates generally to roasting pans, and more specifically to a roasting pan which integrates with a foil pan.

BACKGROUND

Wire stands with top inserts are used to orient pans and enable them to be used more efficiently by optimizing their storage abilities. Typically, a stand holds the pan, while an interior wire pan and insert rest inside the pan. This insert is used, for example, to organize food in a way that allows it to be cooked properly. However, these components are not all one piece. They need to be attachable and detachable in order to allow for removal and entry of an insertable pan and its contents. Hence, this necessitates a system by which the pieces can be assembled and disassembled from the larger structure.

Wire stands are typically utilized to store pans which can be used for containing, cooking, and serving food. Often, one pan is inserted into a cavity of the wire stand, while another upper pan is used to cover the lower pan, thereby enhancing the device's insulating capabilities. These components frequently are in different pieces, which need to be attachable and detachable in order to allow for removal and entry of the pans' contents. Hence, this necessitates a system by which the pieces can be assembled and disassembled from the larger structure, yet securely held in place during use to allow for ease of transport and insulation.

Thus, clamping hooks can act as a means to grip pans and hold them in place. These hooks, though, must be placed in a way such that they integrate with the wire stand and provide ease of assembly. The existing technology to address this issue can be improved, thereby necessitating the disclosed technology for further developments in this area. The existing technology can be improved thereby necessitating the disclosed technology for further developments in this area.

SUMMARY OF THE DISCLOSED TECHNOLOGY

A continuous bottom/side wire extends upwards at opposite ends of a wire stand in order to form bendable handles. The resilient bendability enables modification of the position of the handles with respect to a top closed loop. The handle has bends that can be moved to encircle a part of another wire. Also part of the device are wire supports that connect the top closed loop to the bottom/side wire. A top pan with a lip and an open side facing towards an open side and lip of the bottom pan may be inserted into a cavity defined by the top loop and bottom/side wire. The two pans lips can be abutted, and they can be held in place against each other by the bends of the bottom/side wire.

Embodiments of the disclosed technology will become more clear in view of the following discussion of the figures.

A wire stand may also have a cavity defined by (encircling or forming boundaries thereof) the top loop and bottom/side wire, which is designed to hold a bottom inserted pan that has a lip. A top pan with a lip and an open side facing towards an open side of the bottom pan may also be part of the design. The two pans lips can be abutted, and they can be held in place against each other by the bends of the bottom/side wire.

The part of the bottom/side wire that contains the bends can also be described as a bendable wire clamping hook which is connected to end wires. The semicircular hook is attached to both an upper and a lower straight end wire segment and has a concave and a convex side. The semicircular hook may be bendable when force is applied to the upper straightwire segment, such that the angle between the two end wire segments on the convex side of the bend contracts. When force is not applied to upper end wire, however, the hook and end wires revert back to their original positions, in which the end wire segments parallel to one another in some embodiments.

An angle between the convex side of the clamping hook and a straight end wire segment may be obtuse, while the angle between the convex side of the clamping hook and the other end wire segment may be acute in both original and bent positions.

The two top end wires of two hooks may be adjoined by a perpendicular cross wire, thereby forming a handle mechanism. In some embodiments of the technology, two handles are formed from four clamping hooks that are arranged in a rectangular configuration.

A continuous wire may form two resiliently bendable handles and a base which have two lines of symmetry. The first line of symmetry is equidistant to the bending handles when they are in a resting condition. The second line of symmetry is perpendicular to said first line of symmetry and passes through each of the two resiliently bendable handles. There may be four obtuse bends which connect two parallel wires to upwardly sloping wire segments, each of which have a curved protrusion. Four substantially right angle bends create two cross wires that span the length between the two parallel wires in some embodiments.

In order to use the mechanisms of the wire chafing stand, a series of steps can be followed. First, force is applied to the handles such that the handles move away from each other. The force is maintained in order to hold the handles in their positions.

The bottom pan may then be inserted into the wire stand cavity, such that the upper lip of the pan is oriented upwards. The lip of the upper pan can be abutted to the lip of the lower pan for the entirety of the lengths of the lips. The upper pan is released and allowed to rest in the abutted configuration, such that the two pans substantially enclose an interior space. The handles are released, allowing them to revert back to original positions, such that the bends encircle the lips of the pans. Force is applied to the handles such that the handles move away from each other. The handles are held in this position, while the inserted pans are removed.

For purposes of this disclosure, directional indicators are relative to a typical use of the device with respect to a direction of the pull of gravity. Or, the directional indicators can be understood as being relative to each other wherein "top" or "upper" is opposite "bottom" or "lower" and so forth.

"Closed loop" is defined as "a planar region that is circumscribed by a continuous border."

"Continuous" is defined as "without interruption for at least 95% of a given measured length."

"Inwardly sloping" is defined as "positioned at an angle towards a given point, which is within larger, predefined boundaries."

"Wire" is defined as "a prismic structural component, whose length is elongated in relation to the dimensions of the circumference."

"Bent" is defined as "non-linear at, at least a 5 degree angle."

"Plane" is defined as "a surface in which any given plurality of points, lines, or objects wholly lie."

"Depression" is defined as "a cavity formed from a downward extension of component relative to adjacent components or part(s) of a component."

"Central" is defined as "located, in part, within 15% of the total length of the given surface or wire's midpoint."

"Side portions" is defined as "non-central regions of a given object and/or linear region on either side of a bent region."

"Elongated" is defined as "exceeding another dimension of a given object by a factor of at least ten."

"Frictional" is defined as "resistance that one surface or object encounters when moving over another which, in some embodiments, causes two objections at rest to remain at rest while abutting one another"

"Clamping" is defined as "purposefully applying force to at least one object in order to secure its position at least in part based on friction."

"Spherical" is defined as "having one smooth surface on which every point is substantially the same distance from the center of the solid."

"Majority" is defined as "more than 50%."

"Abutting" or "abutted" is defined as "causing a face of a solid to lie substantially against a face of another solid, such that the two faces are parallel to one another."

"Fixedly connected" is defined as "designed to be attached and remain as such during intended usage of the device for a purpose which it was designed."

"Resiliently bendable" is defined as "being able to be temporarily deformed and substantially or fully return to a pre-deformed position when at rest."

"Cavity" is defined as "a hollow space between wires" such as where a particular grouping of wires are described as surrounding a "cavity".

"Lip" is defined as "the edge of a container or an opening."

"Original position" is defined as "a resting configuration of a device."

"Bent position" is defined as "a modified configuration of a device, relative to the original position, that results from an applied force."

"Rectangular configuration" is defined as "arranged such that four items are in the locations of four vertices of an imaginary rectangle."

"Support" is defined as "a structure that serves to elevate and hold a device's position relative to the ground."

"Encircleable" is defined as "having the ability to surround or be surrounded by another component for a majority of the surface area of the object being described."

Words describing relative heights, such as "raised", "lowered", "lower", "above", and "below" refer, unless stated otherwise, to the orientation in which the device is typically used, which is, from bottom to top, as follows: wire chafing stand, lower pan, base rack, raised rack, upper pan.

Any device or step to a method described in this disclosure can comprise or consist of that which it is a part of, or the parts which make up the device or step. The term "and/or" is inclusive of the items which it joins linguistically and each item by itself.

BRIEF DESCRIPTION OF THE DRAWINGS

FIG. 6 is a side elevation view of the wire stand with clamping hooks in an embodiment of the disclosed technology.

FIG. 7 is a front elevation view of the wire stand with clamping hooks in an embodiment of the disclosed technology.

DETAILED DESCRIPTION OF EMBODIMENTS OF THE DISCLOSED TECHNOLOGY

A wire pan, top insert, and elevation pan are separable and attachable to one another. The wire pan comprises a top closed loop, bent wires with portals on a side or sides of the wire pan, frictional clamping flanges, inwardly sloping wires connecting the top closed loop to a base/bottom side. The wire pan is restable within an elevation pan such that a top wire loop of each are abutted in some embodiments of the disclosed technology. The elevation pan can have stands, bottom wires, clamps, and hooks. The wire pan is placed into the elevation pan and the two are secured by closing the elevation pan's hooks around the top closed loop of the wire pan in some embodiments of the disclosed technology. The top insert comprises of parallel cross wires, as well as connecting end wires. The top insert end wires are designed to be entered into the space between the wire pan's frictional clamping flanges and bent wire, such that the top insert end wires abut a majority of the wire pan's end wires. Fingers can be placed into the portals in order to detach the top insert from the wire pan which are otherwise frictionally held against each other making disconnection thereof without a tool very difficult but for the portal.

Embodiments of the disclosed technology will become more clear in view of the following description of the figures.

Figure 1:
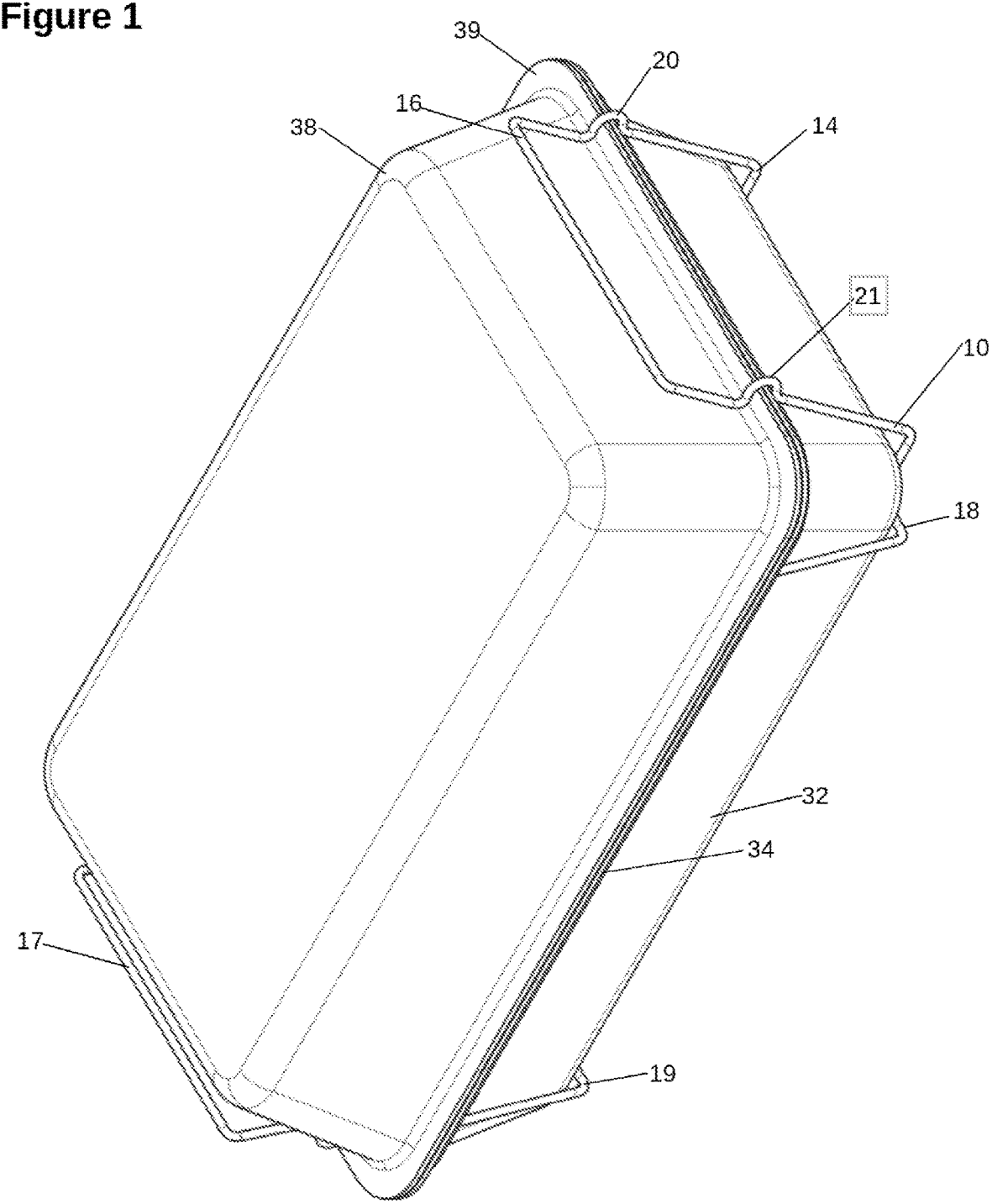
FIG. 1 is a top and side perspective view of the wire stand with clamping hooks and inserted pans in an embodiment of the disclosed technology.

FIG. 1 is a top and side perspective view of the wire stand 10 with clamping hooks and inserted pans in an embodiment of the disclosed technology. Supports 18 and 19 are fixedly connected to top loop wire 12 (see FIG. 4), and stabilize the device's position and elevation. They cross over bottom/side wire 14 at substantially right angles. This contributes to the overall symmetry of the device. Bottom/side wire 14 comprises two parallel segments which slope upwards at the edges of the device to form clamping hooks 20, 21, 22, 23 (see FIG. 4) and, successively, handles 16 and 17. The handles can be used for carrying and transporting the device.

The hooks encircle the abutted lips 34 and 39 of pans 32 and 38 respectively, in some embodiments of the disclosed technology, thus securing the two pans in place within the wire stand. This can allow for easy usage and transport.

Figure 2:
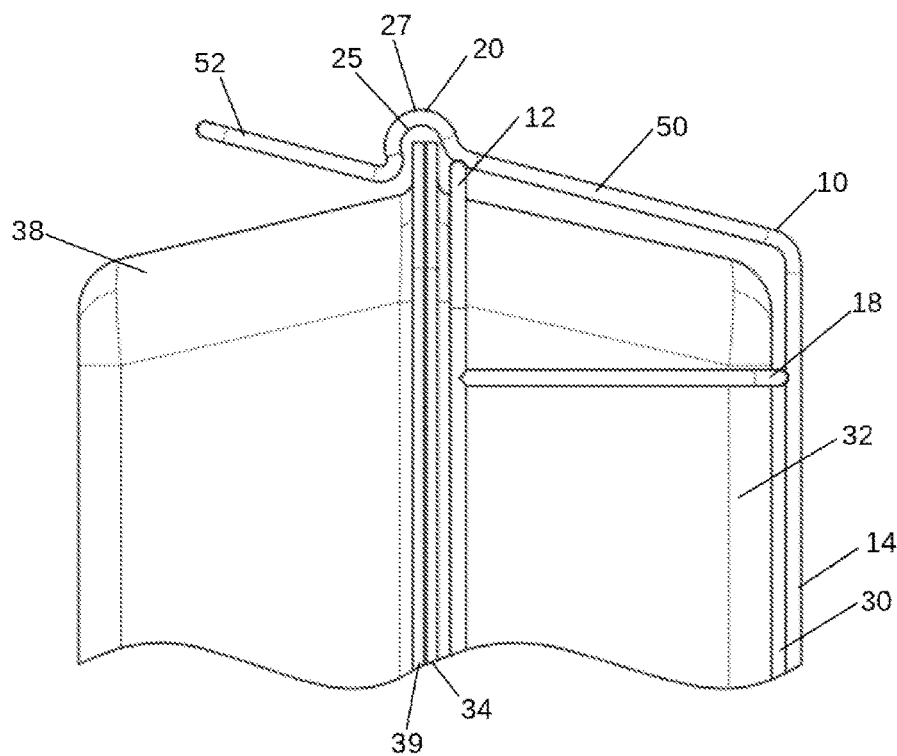
FIG. 2 is a partial elevation view of the wire stand with clamping hooks and inserted pans of FIG. 1 with the pans clamped.
Figure 3:
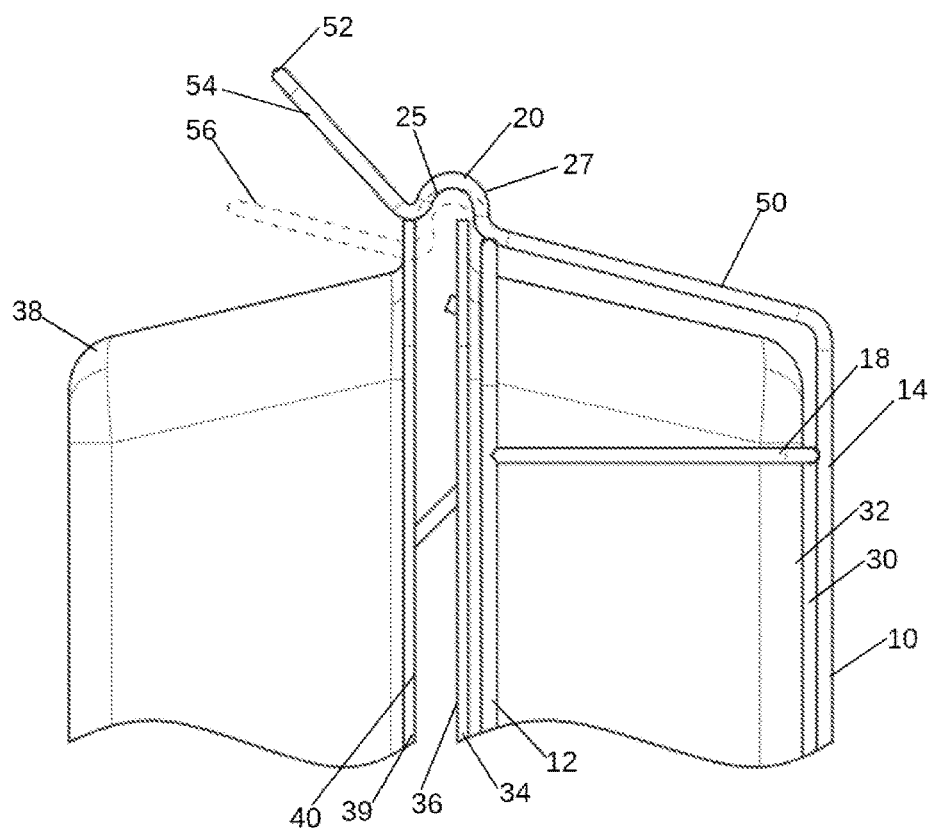
FIG. 3 is a partial elevation view of the wire stand with clamping hooks and inserted pans of FIG. 1 with the pans being clamped.

FIG. 2 is a partial elevation view of the wire stand with clamping hooks and inserted pans of FIG. 1 with the pans clamped, while FIG. 3 is a partial elevation view of the wire stand with clamping hooks and inserted pans of FIG. 1 with the pans being clamped. Both figures show wire stand 10 which comprises top closed loop 12 which is fixedly connected to bottom/side wire 14 and support 18, which is fixedly connected to the two aforementioned components and forms right angles between the components at their intersections. Bottom/side wire 14 comprises lower end wire 50 and upper end wire 52, which are adjoined by bendable wire clamping hook 20. Clamping hook 20 has two sides—a concave side 25 and a convex side 27.

While both clamping hook 20 and upper wire segment 52 are in either original or bent positions, The angle between upper wire segment 52 and clamping hook 20 on convex side 27 is acute. This contrasts the angle between lower wire segment 50 and clamping hook 20 on convex 27 which is obtuse. FIG. 2 shows the clamping hook in original position, whereas FIG. 3 shows the clamping hook in bent position, which is a result of a user of the device applying and maintaining a force on upper wire segment 52. The transition between the two positions of upper wire segment 52 are also visible in FIG. 3. Without modification, the upper wire segment 52 rests as seen in item 56, but when resiliently bent, the upper wire segment 52 is moved to bent position 54, for example.

In an outwardly bent position, such as, when upper wire segment is in an outwardly bent position 54, pans 32 and 38 can be inserted into the wire stand as a distance between each upper wire segment 52 is wider than or substantially equal to that of a longest length of two opposite sides of lips 34 and 39 respectively. In some embodiments, the upper wire segments/hooks are stationary and the pans are deformed somewhat in order to fit the respective pans between the hooks. The tips of the wire pans and/or hooks can then be abutted, and upper wire segment 52 can be released, causing upper wire segment 52 to revert back to original position 56 and encircle the edges of the two loops. This thereby holds the two pans in place, relative to the wire stand, in a resting condition.

Figure 4:
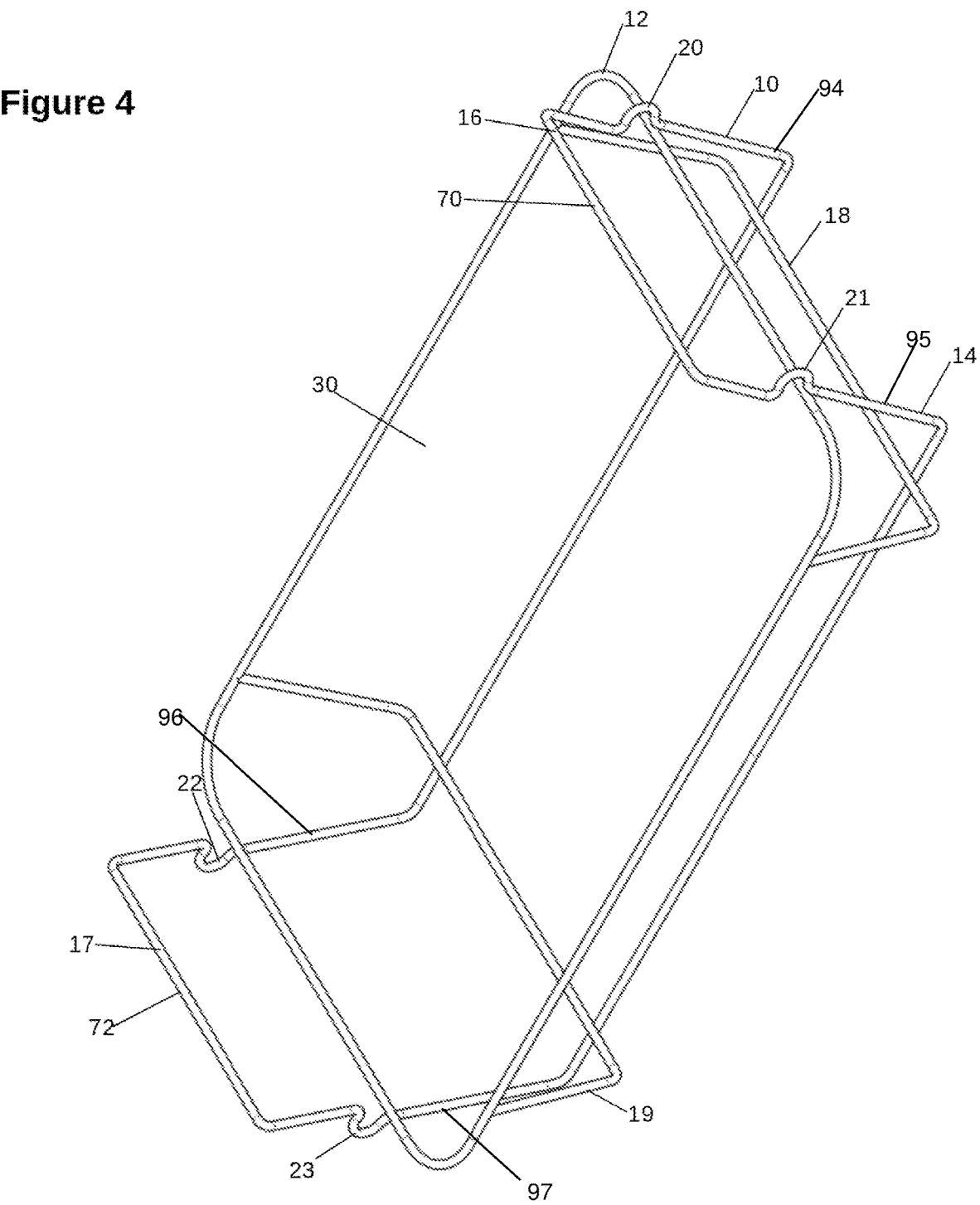
FIG. 4 is a top perspective view of the wire stand with clamping hooks in an embodiment of the disclosed technology.
Figure 5:
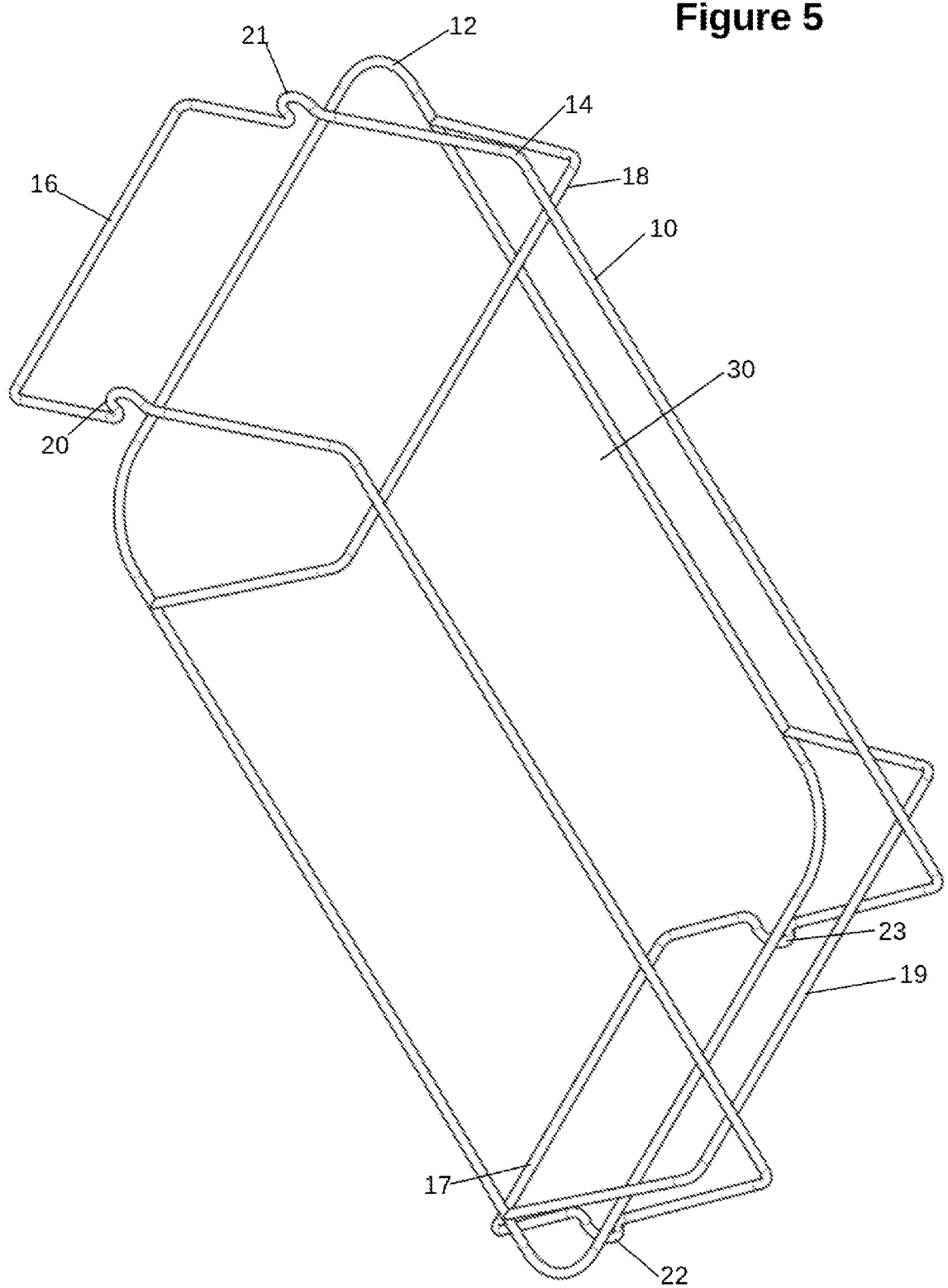
FIG. 5 is a bottom perspective view of the wire stand with clamping hooks in an embodiment of the disclosed technology.

FIG. 4 is a top perspective view of the wire stand with clamping hooks, while FIG. 5 is a bottom perspective view of the wire stand with clamping hooks in an embodiment of the disclosed technology. Depicted are top closed loop wire 12 and fixedly attached supports 18 and 19 which form right angles when they cross over bottom/side wire 14. These aforementioned structures form cavity 30, which is designed to ("created largely for a purpose of") fit a lower pan which can be entered into and secured within the wire stand 10. Shortly after having crossed beneath supports 18 and 19, bottom/side wire 14 slopes upwards, forming four upwardly sloping wires 94, 95, 96, and 97 (see FIG. 8). The sloping wires comprise bends 20, 21, 22, and 23 that serve the purpose of encircling the lips of any pans entered into cavity 30. These bends are arranged in a rectangular configuration in embodiments of the disclosed technology. The upwardly sloping wires are adjoined by cross wires 16 and 17. Thus, each pair of cross wires connected by a cross wire forms a fully functioning handle clamping apparatus.

FIG. 6 is a side elevation view of the wire stand 10 with clamping hooks, while FIG. 7 is a front elevation view of the wire stand 10 with clamping hooks in an embodiment of the disclosed technology. The boundaries of cavity 30 are defined by a top closed loop 12 which is fixedly connected to bottom/side wire 14, as well as supports 18 and 19. Cross wire 16 connect between two upwardly sloping wire segments, thereby forming a complete handle. Items 90 and 92 are two of the four obtuse bends of bottom/side wire 14 that are the points at which the bottom/side wire slopes upwards and becomes upwardly sloping segments. Two such segments, 94 and 96 are shown as they lead to bends 20 and 22 respectively, which can encircle the lips of pans.

Figure 8:
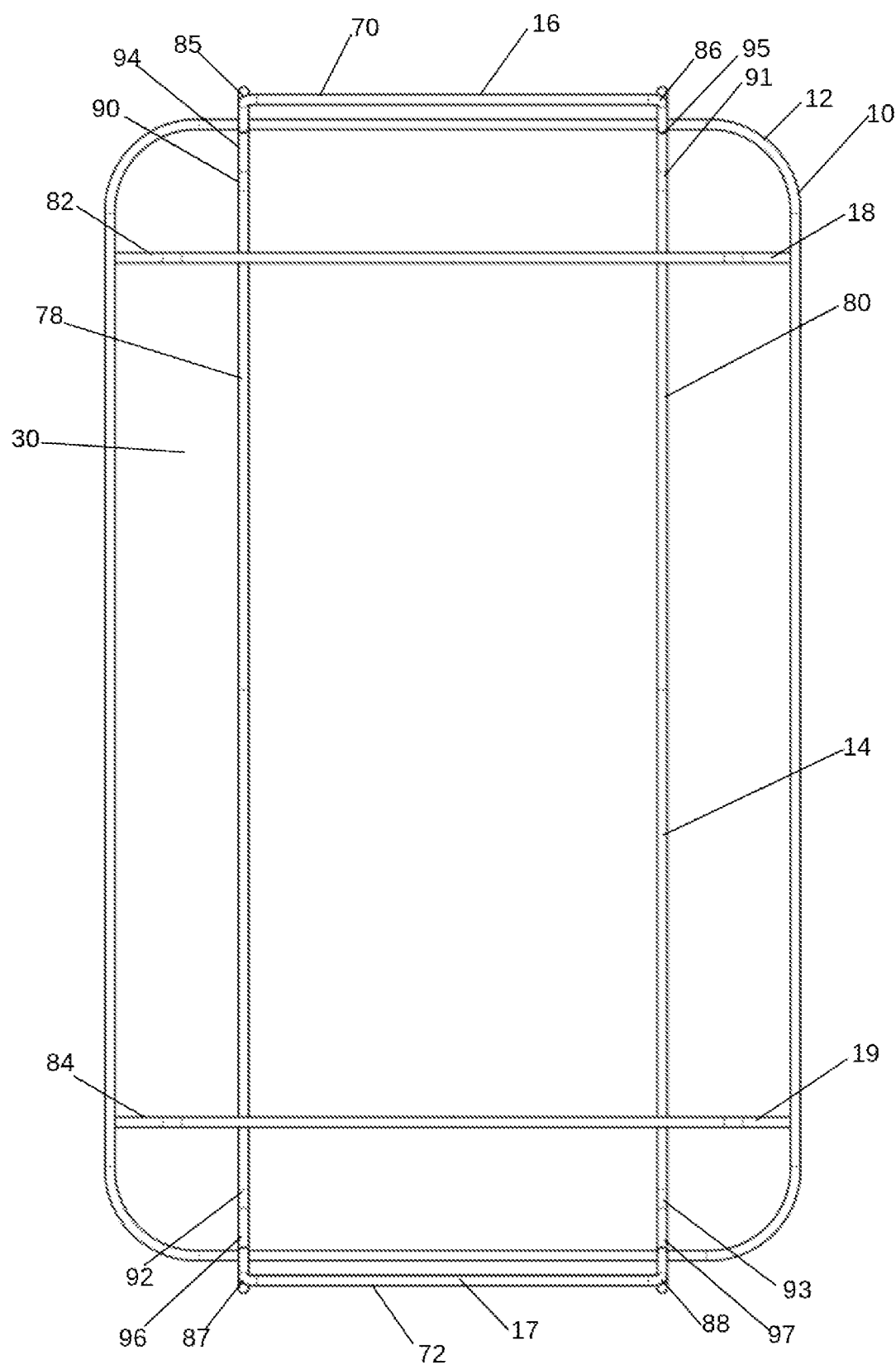
FIG. 8 is a top plan view of the wire stand with clamping hooks in an embodiment of the disclosed technology.
Figure 9:
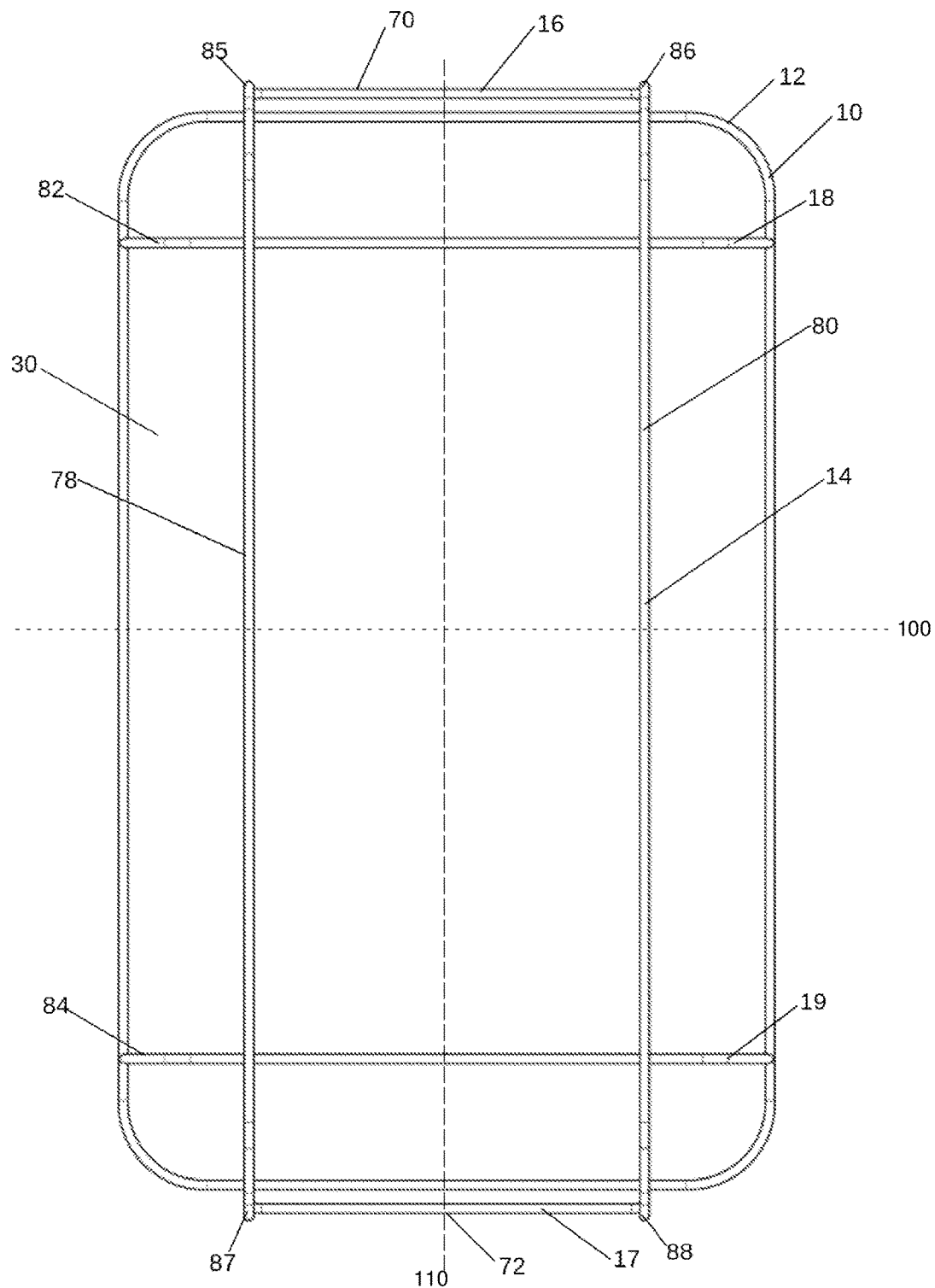
FIG. 9 is a bottom plan view of the wire stand with clamping hooks in an embodiment of the disclosed technology.

FIG. 8 is a top plan view of the wire stand 10 with clamping hooks, while FIG. 9 is a bottom plan view of the wire stand 10 with clamping hooks in an embodiment of the disclosed technology. Shown is cavity 30 which is defined by top closed loop 12, substantially parallel supports 18 and 19 which are formed from bent wires 82 and 84 respectively, and bottom/side wire 14. Bottom/side wire 14 comprises two substantially parallel flat wires 78 and 80. The two intersections of the substantially parallel wires and the substantially parallel supports form a total of 8 substantially right angles. The two substantially parallel flat wires 78 and 80 are fixedly attached to upwardly sloping wire segments 94, 95, 96, and 97 by obtuse bends 90, 91, 92, and 93. The upwardly sloping segments have bends that can encircle inserted pan lips. At the tops of the upwardly sloping segments are perpendicular cross wires 70 and 72 which connect pairs of opposite upwardly sloping segments, in order to form handles 16 and 17. The angles 85, 86, 87, and 88 which are formed by the upwardly sloping segments and the substantially parallel cross wires are substantially right. The entire device is symmetrical upon two lines of symmetry 100 and 110.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A wire stand for accommodating a pan, the pan comprising an upper lip, the wire stand comprising:
   a top closed loop forming a single plane;
   a continuous wire defining sides and bottom of the wire stand, the continuous wire having two end portions extending above the top closed loop, the two end portions forming handles on two opposing sides of the top closed loop, each of said two end portions further including a pair of bends disposed above the top closed loop;
   wire supports fixedly connecting the top closed loop to a segment of continuous wire defining the bottom of the wire stand; and
   wherein, when the pan is accommodated within the wire stand, the top closed loop is adapted to support a lower surface of the upper lip of the pan, and the bends in the continuous wire are adapted to removably and at least partially encircle the upper lip of the pan.

2. The wire stand of claim 1, wherein the bends are resiliently bendable, thereby enabling modification of a position of the handles with respect to the top closed loop.

3. The wire stand of claim 2, further comprising a cavity which is defined by the top closed loop and the bottom and sides of the wire stand defined by the continuous wire, the cavity being adapted to accommodate the pan.

4. The wire stand of claim 3, further comprising:
the pan, having the upper lip and a first open side; and
a top pan having a second lip and a second open side facing towards the first open side of the pan,
wherein the second lip of the top pan is abutted to the upper lip of the pan and the upper and second lips are held in place within the bends of the continuous wire.

5. A method using the wire stand of claim 4, comprising the steps of:
applying force to the handles such that the handles move away from each other, and holding the handles in this position;
inserting the pan into the cavity, such that the upper lip of the pan is oriented upwards and is supported by the top closed loop;
abutting the second lip of the top pan to the upper lip of the pan for the entirety of the lengths of the upper and second lips;
releasing the top pan, allowing it to rest in the abutted configuration, such that the pan and the top pan substantially enclose an interior space;
releasing the force from the handles, allowing the handles to revert back to original positions such that the bends encircle the upper lip and the second lip;
applying force to the handles such that the handles move away from each other, and holding the handles in this position; and
removing said top pan and said bottom pan from the cavity of the wire stand.

6. The wire stand of claim 1, wherein the single plane formed by the top closed loop is substantially horizontal.

7. The wire stand of claim 1, wherein the single plane of the top closed loop is substantially parallel to, and distant from, the bottom of the wire stand formed by the continuous wire.

8. The wire stand of claim 1, wherein the wire supports include end portions which are substantially perpendicular to the top closed loop and a base portion which is substantially perpendicular to portions of the continuous wire forming the bottom of the wire stand.

9. The wire stand of claim 1, wherein each of the wire supports is formed from a separate length of wire, the length of wire of each wire support being separate from the wire forming the top closed loop and from the continuous wire.

10. The wire stand of claim 1, wherein, when the pan is accommodated within the wire stand, the top closed loop is adapted to support the entirety of the upper lip of the pan.

11. A wire stand for accommodating a pan, the pan having an upper lip, the wire stand comprising:
a top closed loop forming a single plane;
a continuous wire forming two resiliently bendable handles and a base, the continuous wire comprising:
two lines of symmetry, including:
a first line of symmetry equidistant to said resiliently bendable handles in a resting condition thereof; and
a second line of symmetry perpendicular to said first line of symmetry and passing through each of said two resiliently bendable handles;
two parallel straight wire segments forming said base;
four upwardly sloping wire segments, each including a curved protrusion;
two cross wires spanning the length between the two parallel straight wires:
four obtuse bends, each disposed at an end of one of said two parallel straight wire segments and connecting to a first end of one of said upwardly sloping wire segments; and
four substantially right-angle bends, each disposed at a second end of one of said upwardly sloping wire segments and connecting to an end of one of the two cross wires;
wire supports fixedly connecting the top closed loop to the base formed by the continuous wire, such that the two cross wires form said resiliently bendable handles on two opposing sides of the top closed loop,
wherein, when the pan is accommodated within the wire stand, the top closed loop is adapted to support a lower surface of the upper lip of the pan, and the curved protrusions are adapted to removably and at least partially encircle the top closed loop or the lip of the pan.

12. The wire stand of claim 11, wherein the curved protrusions are resiliently bendable, and enable resilient bending of the resiliently bendable handles with respect to the top closed loop.

13. The wire stand of claim 12, wherein a cavity is defined by the top closed loop and by the continuous wire, the cavity being adapted to accommodate the pan.

14. The wire stand of claim 13, further comprising:
the pan, including the upper lip and having a first open side; and
a top pan having a second lip and a second open side facing towards the first open side of the pan
wherein the second lip of the top pan is abutted to the upper lip of the pan and the upper and second lips are held in place within the curved protrusions of the continuous wire.

15. The wire stand of claim 11, wherein:
each of the curved protrusions is fixedly connected, on either side thereof, to an upper straight end wire segment and lower straight end wire segment, the upper and lower straight end wire segments together forming one of said upwardly sloping wire segments, and each of the curved protrusions having a concave and a convex side;
each said curved protrusion is resiliently bendable upon an application of force, by a user of the wire, to the upper straight end wire segment, such that the angle between the upper straight end wire segment and the lower straight end wire segment, on the convex side of the curved protrusion, contracts; and
upon the cessation of application of the force to the upper straight end wire segment, the curved protrusion, upper straight end wire segment, and lower straight end wire segment revert back to resting positions.

16. The wire stand of claim 15, wherein the upper straight end wire segment and the lower straight end wire segment are parallel to one another when in the resting positions.

17. The wire stand of claim 16, wherein an angle between the convex side of the curved protrusion and the lower straight end wire segment is obtuse, while an angle between the convex side of the curved protrusion and the upper straight end wire segment is acute in both the resting position and a bent position.

18. The wire stand of claim 11, wherein the two resiliently bendable handles are formed from the four curved protrusions, the four curved protrusions being arranged in a rectangular configuration.

19. The wire stand of claim 11, wherein at least one of the following is true:
- the single plane formed by the top closed loop is substantially horizontal; and
- the single plane of the top closed loop is substantially parallel to, and distant from, the base formed by the continuous wire.

20. The wire stand of claim 11, wherein the wire supports include end portions which are substantially perpendicular to the top closed loop and a base portion which is substantially perpendicular to portions of the continuous wire forming the base.

\* \* \* \* \*